July 15, 1924.
J. D. ELLISON
MEASURING INSTRUMENT
Filed Sept. 13, 1922
1,501,588
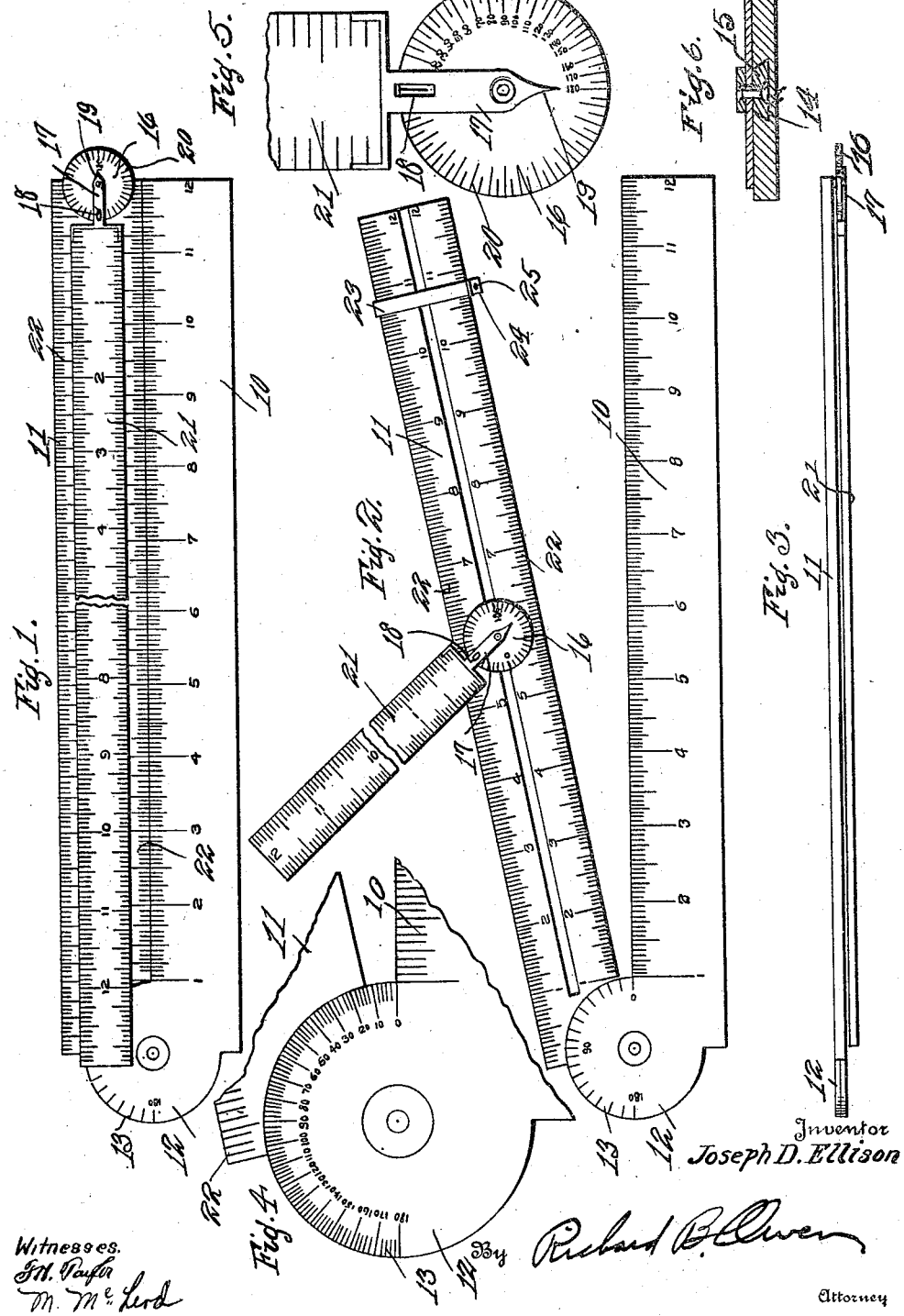
Witnesses.
Inventor
Joseph D. Ellison
By Richard B. Owen
Attorney Patented July 15, 1924.

1,501,588

UNITED STATES PATENT OFFICE.

JOSEPH D. ELLISON, OF PITTSBURGH, PENNSYLVANIA.

MEASURING INSTRUMENT.

Application filed September 13, 1922. Serial No. 588,026.

*To all whom it may concern:*

Be it known that I, JOSEPH D. ELLISON, a citizen of the United States, residing at Pittsburgh, in the county of Allegheny and State of Pennsylvania, have invented certain new and useful Improvements in Measuring Instruments, of which the following is a specification.

This invention relates to measuring instruments and has special reference to a folding rule and compound protractor.

One important object of the invention is to improve the general construction of devices of this character.

A second important object of the invention is to provide an improved device of this character wherein one angle may be set off from a given line and a second angle set off from the first angle at a predetermined point or position along the line of the first angle.

A third important object of the invention is to provide an improved attachment for rules wherein arcs may be drawn of any desired radius within the limit of the length of a limb or joint of the rule.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a face view of the device folded.

Figure 2 is a similar view of the device unfolded.

Figure 3 is an edge view of the device folded.

Figure 4 is an enlarged detail view of the main protractor, the view showing the face thereof.

Figure 5 is a view similar to Figure 4 but showing the auxiliary protractor.

Figure 6 is a detail section through the rule and auxiliary protractor, the view being on an enlarged scale.

The invention in the form herein shown, consists of a 24 inch rule whereof 10 indicates one of the members and 11 the other, said members being connected by the ordinary rule hinge, or pivot 12. On the face of this rule hinge, or pivot is provided a protractor 13 so that the edge of the member 11 may swing around this protractor and thus it will indicate the angular distance between the members 10 and 11. The member 11 is provided with a longitudinally extending dove-tail slot 14 wherein fits a dove-tail block 15 carrying a circular protractor 16 which is fixed thereto in any suitable manner and is so arranged that the zero and 180° marks lie on the center line of the member 11. Pivoted centrally of the protractor 16 is an arm 17 having a slot 18 and pointer 19 disposed in diametrically opposite relation so that diametrically opposite graduations 20 formed on the protractor 16 may be read. This arm 17 carries a blade, or rule 21 and the block 15 is so fitted in the dove-tail slot 14 that a considerable force is required to move the same whereby, when it is moved to a position, it will tend to remain in that position. It will be seen that the 90° graduations of the protractor 16 will lie perpendicularly to the center line of the arm 11 and thus indicate the position of the center of the protractor by readings on the scales 22.

In the operation of this part of the device the blade 10 is set on a given line and the blade 11 moved away from the blade 10, the required angular distance being indicated by the protractor scale 13. The protractor 16 is then moved longitudinally of the blade 11 to bring it to the required distance from the center of rotation of said blade. Finally, the arm 21 is rotated to the proper angular relation with the arm 11 and the angles between the blades 10 and 11, and the blades 11 and 21 may be readily laid off.

In addition to the foregoing a slide 23 is provided on the blade 11 and at one end of this slide is a projecting, or overhanging portion 24 having an opening 25 to receive the point of a pencil. This slide may be advanced longitudinally of the blade 11 the distance being obtained from the scales 22, a pencil may then be inserted through the opening 25 and an arc of the desired radius may be inscribed by moving the blade 11 while the blade 10 is held immovable.

There has thus been provided a simple and efficient device of the kind described and for the purpose specified.

It is obvious that minor changes may be made in the form and construction of the invention without departing from the spirit thereof. It is not, therefore, desired to confine the invention to the exact form herein shown and described, but it is desired to include all such as properly come within the scope claimed.

Having thus described the invention, what is claimed as new, is:—

In a rule including a blade having a longitudinally extending dove-tailed slot in one face thereof, a dove-tail block slidable in said dove-tail slot, a protractor carried by said dove-tail block and having its zero and 180° marks coincident with the center line of the blade, an arm pivoted centrally of said protractor and carrying a pointer transversing the scale of the protractor, and a blade fixed to said arm to revolve therewith.

In testimony whereof I affix my signature in presence of two witnesses.

JOSEPH D. ELLISON.

Witnesses:
W. S. STILLWAGON,
A. H. APPEL.